United States Patent
Tan et al.

(10) Patent No.: US 10,482,109 B2
(45) Date of Patent: Nov. 19, 2019

(54) OBJECT INDEXING METHOD, OBJECT SEARCHING METHOD, AND OBJECT INDEXING SYSTEM

(71) Applicant: CANON KABUSHIKI KAISHA, Tokyo (JP)

(72) Inventors: Cheng Tan, Beijing (CN); Yaohai Huang, Beijing (CN); Rongjun Li, Beijing (CN); Sen Na, Beijing (CN); Hirotaka Shiiyama, Yokohama (JP); Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 15/275,881

(22) Filed: Sep. 26, 2016

(65) Prior Publication Data
US 2017/0091308 A1     Mar. 30, 2017

(30) Foreign Application Priority Data
Sep. 29, 2015    (CN) .......................... 2015 1 0639082

(51) Int. Cl.
*G06F 16/28* (2019.01)
*G06F 16/25* (2019.01)
*G06F 16/22* (2019.01)

(52) U.S. Cl.
CPC ........ *G06F 16/285* (2019.01); *G06F 16/2228* (2019.01); *G06F 16/258* (2019.01); *G06F 16/289* (2019.01)

(58) Field of Classification Search
CPC ......... G06F 17/30598; G06F 17/30321; G06F 17/30569; G06F 17/30607
See application file for complete search history.

(56) References Cited

U.S. PATENT DOCUMENTS

| | | | | |
|---|---|---|---|---|
| 2006/0074973 | A1* | 4/2006 | Platt | ........................ G06F 16/58 |
| 2008/0166057 | A1* | 7/2008 | Nakajima | ......... G06F 17/30796 |
| | | | | 382/229 |
| 2010/0082630 | A1* | 4/2010 | Zagelow | ........... G06F 17/30336 |
| | | | | 707/741 |

(Continued)

FOREIGN PATENT DOCUMENTS

| | | |
|---|---|---|
| CN | 101807073 A | 8/2010 |
| CN | 103235825 A | 8/2013 |
| JP | 5155025 B2 | 2/2013 |

*Primary Examiner* — Matthew J Ellis
(74) *Attorney, Agent, or Firm* — Canon U.S.A., Inc. I.P. Division

(57) ABSTRACT

One or more embodiments relate to an object indexing method, object indexing device and object indexing system. An object indexing method may include an initializing step of dividing at least one first data container and at least one second data container, and initializing respectively the first and the second data containers by using a first data indexer and a second data indexer; a first indexing step of adding the input feature vector of a specific object into a first data container currently being filled by using the first data indexer; and a second indexing step, when the data size in the first data container being filled has reached a threshold, selecting another first data container as the first data container currently being filled, and in the case of executing the first indexing step, converting bulk data in the first data container previously being filled into one available second data container.

21 Claims, 10 Drawing Sheets

(56) References Cited

U.S. PATENT DOCUMENTS

| | | | |
|---|---|---|---|
| 2011/0307736 A1* | 12/2011 | George | G06F 17/30519 |
| | | | 714/6.2 |
| 2015/0242146 A1* | 8/2015 | Shinozaki | G06F 12/00 |
| | | | 711/162 |
| 2016/0321265 A1* | 11/2016 | Cevahir | G06F 17/3053 |
| 2017/0091469 A1* | 3/2017 | Leemet | G06F 17/30076 |

* cited by examiner

OBJECT INDEXING METHOD, OBJECT SEARCHING METHOD, AND OBJECT INDEXING SYSTEM

CROSS-REFERENCE TO RELATED APPLICATION(S)

This application claims the benefit of, and priority to, CN Application No. 201510639082.9 entitled "OBJECT INDEXING METHOD, OBJECT SEARCHING METHOD, AND OBJECT INDEXING SYSTEM" filed on Sep. 29, 2015, the content of which is incorporated by reference herein in its entirety.

BACKGROUND

Field of the Invention

The present disclosure generally relates to an object indexing method, particularly to an object indexing method for indexing an object into a database rapidly. The present disclosure also relates to an object searching method and an object indexing system which apply said object indexing method.

Description of the Related Art

Currently there exist a number of object indexing and searching applications in which an object is for example a human face, a specific text or audio. For example, video surveillance is used to capture and record videos of a number of public, private locations such as airports, railway stations, supermarkets, houses and other locations with the presence of human, cars, etc. The surveillance cameras will capture and record lots of objects into database for long period of time, called an indexing process, so that the past presence of human or cars, etc. can be retrieved and inspected, called a searching process. However the manual check of large size of video data can be extremely labor intensive and time consuming. The manual checking method is not suitable for many scenarios which require retrieving in real time. For example, parents need to find their separating children in airport as quickly as possible avoiding delay an international trip. In such a case, human image retrieving algorithms in real time have been developed such that a target object can be indexed and retrieved in a short time period.

Conventional human image retrieve approaches at least include two processes of image indexing and image searching. The image indexing process includes features calculation, feature based clustering, and clustering based classification. The corresponding image searching process includes similarity calculation of comparing a querying image to the value of cluster centers, cluster identification of identifying clusters with the minimal distance, and image retrieving of retrieving similar images from the identified clusters.

For video surveillance applications, fast indexing is needed so that we can search for wanted human in real time. For fast indexing, there may be many human images in one second. The total indexing time of the above images should be shorter than one second. Otherwise the fast indexing system will be blocked, and the delay time for indexing images will become longer and longer.

In a Japanese patent application JP05155025, a cluster based similar image search approach is described for human image indexing. First, an image is classified into nearest cluster. Then, when the size of the cluster is larger than a threshold value, all nodes of this cluster and nearby clusters are read into a memory to calculate the energy and then split it.

There are some issues with this approach. Although the complex constructing process for registering bulk images can improve accuracy in search, the register time is long and the delay is long. When reaching split or reconstruct condition, CPU will be very busy in calculation and large amount of disk I/O is needed and thus the system cannot respond to any new register image with the result of a low capacity of load. We should avoid this case during fast indexing, especially when large amount of human keep coming in a short period of time. On the other hand, in order to synchronize indexed data for search, transaction should be used. So the delay time is long. If using fast indexing for registering image one by one can reduce the delay time, then the accuracy in search is very low. When the fast indexing process uses category classifying, it is difficult to control the member size for each category. Maybe all images during this period are classified into the same category. At this situation, the search speed becomes slow and this approach is similar to a scan method.

SUMMARY OF THE INVENTION

One of the objects of at least one embodiment of the present disclosure is to reduce the time needed to calculate and accessing data so as to increase the throughput and decrease the delay by proposing a fast object indexing method and object indexing device.

According to one aspect, at least one embodiment of the present disclosure relates to an object indexing method, comprising: an initializing step of dividing at least one first data container and at least one second data container, and initializing the first and the second data containers by using a first data indexer and a second data indexer, the first and second data indexers being used respectively to filling the first and the second data containers and creating the data structures in the first and the second data containers; a first indexing step of adding the input feature vector of a specific object into a first data container currently being filled by using the first data indexer; and a second indexing step, when the data size in the first data container currently being filled has reached a threshold, selecting another first data container as the first data container currently being filled, and in the case of executing the first indexing step converting bulk data in the first data container previously being filled into one available second data container by using the second data indexer; wherein the sizes of the first and the second data containers are set such that the time period in which the second data indexer converts the bulk data into the second data container is no larger than the time period in which the first data indexer fills the first data container to the threshold.

According to another aspect, at least one embodiment of the present disclosure is related to an object searching method, comprising: an acquiring step of acquiring a feature vector of an input query image; a similarity calculation step of calculating similarity between the feature vector of the input query image and the feature vectors of objects indexed by the object indexing method; and an outputting step of outputting object search result by the calculated similarity.

According to yet another aspect, at least one embodiment of the present disclosure relates to an object indexing device, comprising: an initializing means configured to divide at least one first data container and at least one second data container, and initialize the first and the second data containers by using a first data indexer and a second data indexer, the first and second data indexers being used respectively to filling the first and the second data containers and creating the data structures in the first and the second data containers; a first indexing means configured to add the input feature vector of a specific object into a first data container currently being filled by using the first data indexer; and a second indexing means configured to, when the data size in the first data container currently being filled has reached a threshold, select another first data container as the first data container currently being filled, and in the case of indexing by the first indexing means convert bulk data in the first data container previously being filled into one available second data container by using the second data indexer; wherein the sizes of the first and the second data containers are set such that the time period in which the second data indexer converts the bulk data into the second data container is no larger than the time period in which the first data indexer fills the first data container to the threshold.

According to another aspect, at least one embodiment of the present disclosure is related to an object searching device, comprising: an acquiring means configured to acquire a feature vector of an input query image; a similarity calculation means configured to calculate similarity between the feature vector of the input query image and the feature vectors of objects indexed by the object indexing device; and an outputting means configured to output object search result by the calculated similarity.

According to yet another aspect, at least one embodiment of the present disclosure relates to an object indexing system implemented on a computer including one or more processors and one or more storage means, the processor being configured to realize the object indexing method.

Therefore, according to various aspects of one or more embodiments of the present disclosure, different indexing methods can be used in different data containers in parallel. The sizes of the first and the second data containers being set such that the time period in which the second data indexer converts the bulk data into the second data container is no larger than the time period in which the first data indexer fills the first data container to the threshold, so as to reduce calculation and data accessing time. It is apparent that more input objects can be supported in real time when performing fast indexing.

BRIEF DESCRIPTION OF THE DRAWINGS

The above and more objects and advantages of the present disclosure will be further described in combination with the specific embodiments with reference to the accompanying drawings. In these drawings, identical or corresponding technical features or components will be represented by identical or corresponding reference numerals.

DESCRIPTION OF THE EMBODIMENTS

Figure 1:
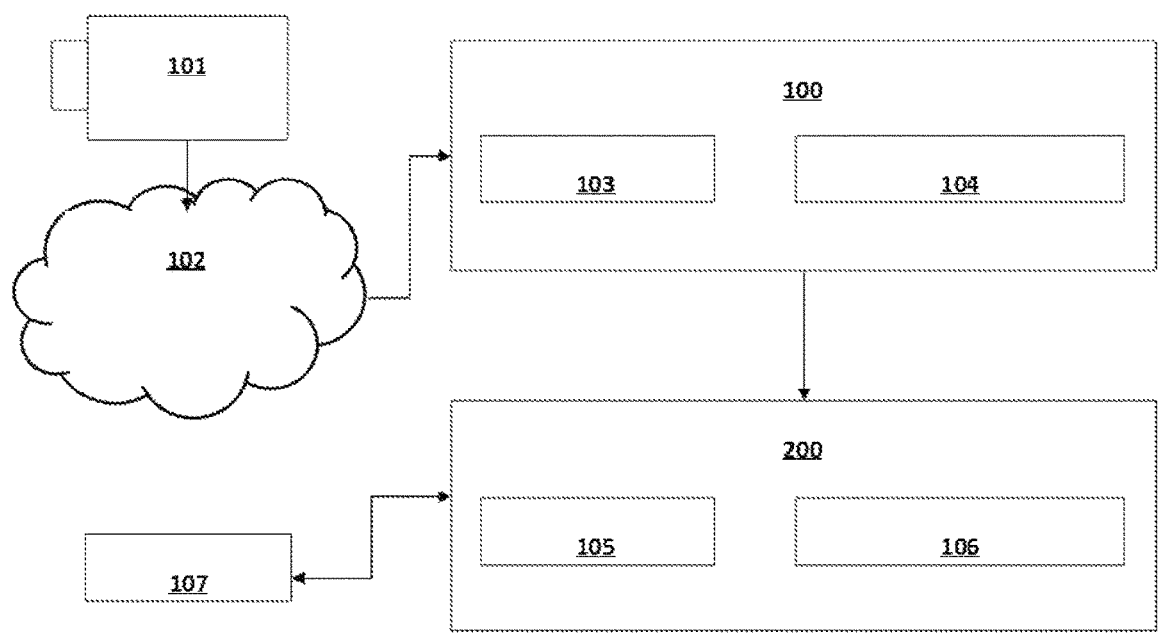
FIG. 1 illustrates a block diagram of a human image search system according to the present disclosure to which an object indexing method is applied.

The exemplary manners of realization and embodiments of the present disclosure will be described in conjunction with the appended drawings hereinafter. For clarity and simplicity, not all of the features of the embodiments are described in the description. However, it will be understood that various embodiment-specific settings have to be made in the process of implementing the embodiments, so as to achieve the specific goals of the developers, for example, those constraint conditions related to system and service, and those constraint conditions may be varied between embodiments. Further, it shall also be understood that although development effort may be very complex and time-consuming, such development effort is merely routine task for those skilled in the art benefiting from the teaching of the disclosure.

Herein, it is also to be noted, in order to avoid obscuring the disclosure by unnecessary details, only process steps and/or system structures closely related to the solutions at least in accordance with one or more embodiments of the disclosure are illustrated in the accompany drawings, and other details with less relationship to the application will be omitted.

For easy of description, some concepts of the present disclosure will be introduced simply hereinafter. In the present disclosure, a description will be given by taking a specific object in an image such as human face as an example of an object. However, it shall be understood that the object is not limited as the human face and can be a specific text of documents or a specific speech of audio in other applications. A feature vector is extracted from an image, text, audio, video and the like by using a feature extraction method. The features can include low level features such as wavelets (e.g. Haar feature), texture features (e.g. LBP feature, SIFT feature, SURF feature, and HOG feature), color features (e.g. HSV feature, RGB feature), and list of visual words; and high level features such as human attributes, e.g. race, age, gender, and hair color of a person. In modern computer architecture, storage means includes volatile storage such as memory and non volatile storage such as hard disk, flash disk and remote disk. The data container of the present disclosure can be flexibly selected from these storages according to specific applications and performance requirements. During the initialization period, data containers are divided from these storages at predefined size for storing the feature vectors of the specific object. Then, an indexer selected for the data containers fills the data containers and constructs data structures in these data containers by using the feature vector of input objects for subsequent search process. As an example of indexer, we can list a sequence indexer, a classifying indexer, a clustering indexer, an inverted indexer, a tree indexer, a hash indexer and the like. The indexers of the present disclosure can be flexibly selected from these indexers according to data containers and performance requirements.

Hereinafter, various aspects of the present disclosure will be described by taking a human face in an image as an example. FIG. 1 is a block diagram of an image retrieval system according to the present disclosure to which an image indexing method is applied. The system mainly includes video analyzer 100 and image extractor 200. The video analyzer 100 includes a video recorder 103 and an image feature extractor 104. The image extractor 200 includes an image indexer 106 and an image searcher 105. The video analyzer 100 is configured to receive directly or via a network 102 the captured scene video from a camera 101 and extract feature vectors of the video images. The image indexer 106 is configured to organize these feature vectors into a proper data structure. The image searcher 105 is configured to use the distances between the extracted features of a querying image and the feature vectors in the data structure to retrieve similar images for presenting to a user.

Figure 2:
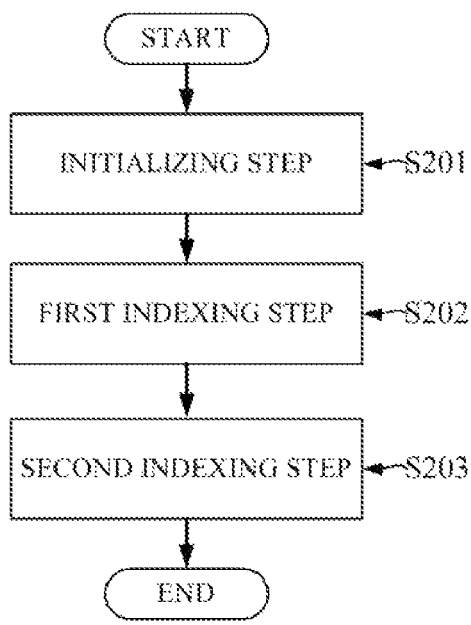
FIG. 2 illustrates a flowchart of the object indexing method according to the present disclosure.

Next, a flowchart of an object indexing method in accordance with the present disclosure will be described by reference to FIG. 2. In this method, different indexing methods are used in parallel in different data containers so as to reduce calculation and disk data accessing time and thus support more input images in unit time period.

Step S201 is an initializing step of dividing at least one first data container and at least one second data container, and initializing respectively the first and the second data containers by using a first data indexer and a second data indexer, the first and second data indexers being used respectively to fill the first and the second data containers and construct data structures in the first and the second data containers.

As mentioned in the above, the first and second data containers can be selected from the volatile and not volatile storage means. The first and second data indexer can be selected from the sequence indexer, the classifying indexer, the clustering indexer, the inverted indexer, the tree indexer, the hash indexer and the like. Initialization can be understood as giving parameters specific to the indexers to the corresponding data containers. Taking the classifying indexer as an example, initialization can be understood as loading in the data containers predefined category representation vectors characterizing the classifying indexer. The predefined category representation vectors are for example cluster centers or inverted keys (e.g. visual words). After the cluster centers have been loaded, we can classify a feature vector according to the similarity between the feature vector and the cluster centers. Further, after the inverted keys have been loaded, we can index the feature vector according to the similarity between the feature vector and the inverted keys.

Preferably, the initialization step further includes initializing the first data container by using the first data indexer when one of the following conditions is met: the size of data filled in the first data container reaches a threshold; the time length of filling in the first data container reaches a preset length.

Preferably, the threshold may be the maximum size of the first data container.

Step S202 is a first indexing step of adding the input feature vector of a specific object into a first data container currently being filled by using the first data indexer.

Here, the specific object may be face images of the persons entering into a specific location such as airport, railway station and the like. The feature vectors may be extracted LBP features, attribute features and the like, as mentioned in the above.

A first data container selected from the first data containers in the initialization step is filled by the first indexer. For example, if a sequence indexer is selected, it stores the feature vectors into the first data container sequentially. If a classifying indexer is selected, it adds the feature vectors into the corresponding categories according to the similarity with predefined categories. If a clustering indexer is selected, it clusters the feature vectors into the corresponding clusters according to a clustering method.

Step S203 is a second indexing step, in which when the data size in the first data container currently being filled has reached the threshold, selecting another first data container as the first data container currently being filled, and in the case of executing the first indexing step, converting bulk data in the first data container previously being filled into one available second data container by using the second data indexer.

Therefore, while persons keep entering the airport, the first indexing step indexes the feature vectors of the captured images of respective persons into the first data container. When the data size in the first data container currently being filled has reached the threshold, the first and second indexing steps are executed in parallel, that is, the first indexing step continues indexing the input feature vectors into the first data container being filled next and the second indexing step indexes the bulk data in the first data container previously being filled to the threshold into the available second data container.

Depending on the applications, the first and second indexers are likely to be different indexers and the data structures filled by them are also different. Thus, the second indexer need to convert the data structure instead of directly transferring the bulk data into the second data container. Moreover, since the second indexing step directly converts the bulk data instead of single input image, these bulk data can be handled at one time by using existing batch processing method such that calculation time and data accessing time are saved significantly compared with the case of handling the input feature vector of each single image.

In one or more embodiments of this application, the sizes of the first and the second data containers are set such that the time period in which the second data index converts the bulk data into the second data container is no larger than the time period in which the first data indexer fills the first data container to the threshold. Therefore, it is assured that different indexing methods (indexers) are used for indexing in different data containers in parallel, such that faster and more accurate indexing can be obtained in real time even when feature vectors are input continuously. These advantages will be better understood according to the detailed description to the specific manners of realization.

Figure 3A:
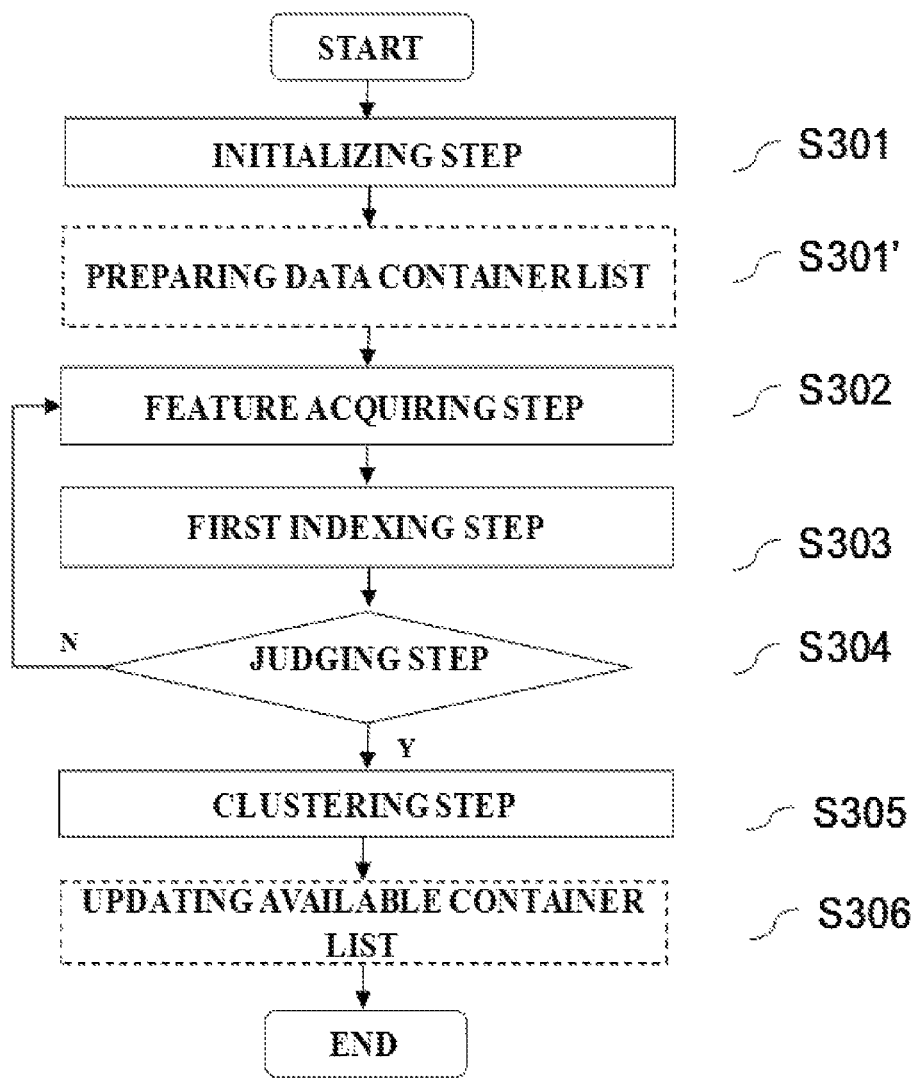
FIGS. 3A to 3B respectively illustrates a flowchart of according to a first manner of realization of the object indexing method of the present disclosure and a schematic representation of advantage of the object indexing method according to the first manner of realization.

Next description will be given to the first manner of realization of the object indexing method of the present disclosure by reference to a flowchart of FIG. 3A. In this manner of realization, the first data container is obtained from the memory and the second data container is obtained from the hard disk and the classifying indexer is selected as the first data indexer and the clustering indexer is selected as the second data indexer.

Step S301 is the initialization step of dividing at least one first data container from the memory and at least one second data container from the hard disk and then using the classifying indexer to initialize the first data container and using the clustering indexer to initialize the second data container as mentioned in the above. The memory provides rapid accessing and the hard disk provides permanent storage.

In an optional step S301' indicated by a dash line, we can also prepare a usable first data container list and a usable second data container list to record the data containers filled to the threshold for subsequent searching process.

Step S302 is a feature acquiring step of acquiring the features of input images. For fast indexing application, images are inputted one and one. These images are detected by other modules such as face detection modules. The feature vectors of the detected images are then extracted to represent respective images. There are many kinds of feature vectors for the images, such as LBP, SIFT, HOG and the like. Here LBP feature is extracted as an example.

Step S303 is the first indexing step of adding or indexing the feature vectors of the images into the first data container by using the classifying indexer for the LBP features.

First, a similarity score based on the distance between the randomly selected cluster centers of the classifying indexer and the input feature vectors is calculated. Next, the similarity scores of all cluster centers are ranked to obtain the closest cluster center with the highest similarity score. Next, the input image and the extracted feature vector are stored into a membership list of the closest cluster center. Since there is no need of iterative calculation step for clustering due to the use of classifying indexer, the time for indexing each image is very short so as to support fast indexing with high load.

Step S304 is a judging step of judging whether the data size in the first data container currently being filled reaches the threshold. If not, it continues to Step S303. Otherwise, another first data container is selected as the first data container currently being filled and it proceeds into step 305 while continuing to execute step S303.

Step S305 is a clustering step of converting bulk data constructed in step S303 into a second data container currently available. Here, clusters are constructed by the clustering indexer for LBP features with respect to the bulk data and then the clustering results are stored into the second data container. Clustering methods for providing a highly accurate indexing result, such as K-means, are known technique in the art and thus are not redundantly described herein.

The bulk data makes it possible to improve conversion speed significantly with respect to single input data. For example, a number of indexing speed improvement methods, for example batch processing method such as parallel clustering method, sampling method and other method can be used. These methods can assure the time consumed by clustering is no longer than the indexing time of filling the first data container to the threshold.

According to another preferable embodiment, the complex clustering indexing method is executed in a background thread different from a foreground thread in which the first indexing step is executed. Preferably, the clustering process can be executed in multi-threads parallel mode so as to further assure the foreground thread for fast indexing being not blocked by the background thread for clustering.

According to yet another preferable embodiment, before clustering, generating a backup of the bulk data in the first data container previously filled to the threshold and releasing the data in the first data container. Before the clustering of the current bulk data is finished, the subsequent fast search process is supported by using the backup with the same bulk data and the other second data containers having stored the clustering results therein. After the clustering of the current bulk data is finished, the subsequent fast search process is supported by using the other second data containers and the current second data container having stored the current clustering result therein. The advantage is to reduce the delay time of fast search and assure no loss of data for the search process.

Preferably, the feature vectors of each member image of each cluster will be store in a continuous space in the hard disk. This can improve the speed of reading data in the clusters.

In an optional step S306 indicated by a dash line, usable data container lists are updated to adding a record of the current second data container and removing a record of the first data container related to this time of conversion. The added records can indicate the target containers for the subsequent search process.

Therefore, according to this manner of realization, by using the memory container providing fast accessing speed and the hard disk container providing permanent storage and by selecting the relatively fast classifying indexer and the relatively accurate clustering indexer, it is assured that the clustering time for the bulk data is no larger than the time of filling the first data container to the threshold and the calculation and disk data accessing time is reduced such that blocking can be avoided as much as possible even when the feature vectors are input continuously.

Figure 3B:
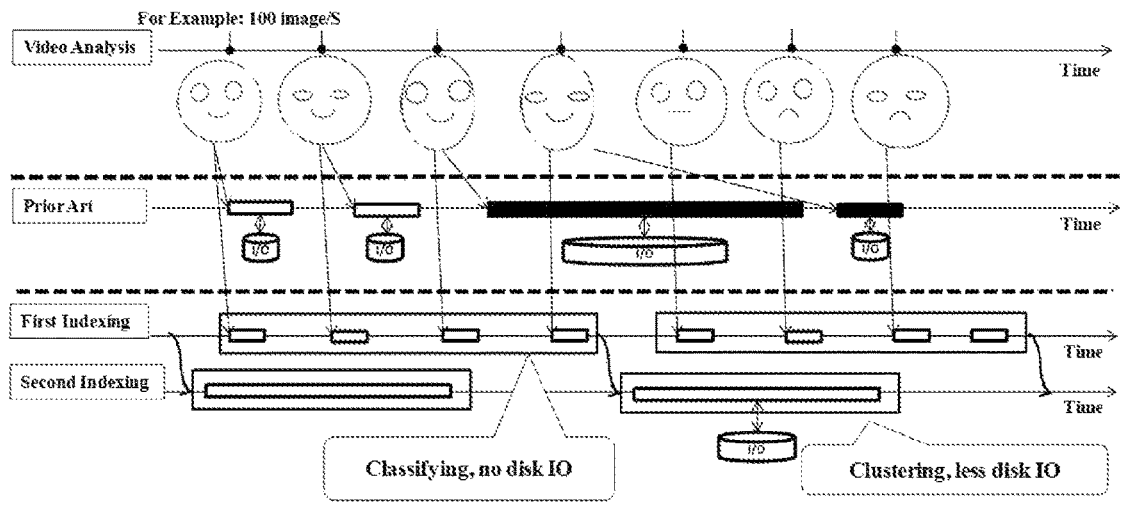

FIG. 3B further illustrates a schematic view of advantages of the object indexing method according to this manner of realization compared with the document JP5155025. In the case of a rate of 100 images per second, for the prior art, serious delay and blocking occur as the images are progressively input, as shown by the black rectangular block. In contrast, due to the improved solution of the present disclosure, delay and blocking are reduced significantly.

Next, a modified manner of realization of the above manner of realization will be described. In the above manner of realization, the predefined category representation vectors of the classifying indexer such as cluster centers are selected randomly. This assumes that the distribution of the images to be input is the same as one of all history images. However, this assumption is invalid in certain cases. For example, the race distribution of passengers at the airport is uniform in a week while the one is Gaussian for passengers waiting boarding from China to Japan because most of them are Asian. This will lead to the situation of excessive feature vectors in a category and this situation is adverse to the subsequent searching process in terms of search time and accuracy.

For this reason, in this modified manner of realization, it is proposed to select the predefined category representation vectors according to a selected predefined category representation vectors template, the predefined category representation vectors templates being separately built based on the data of respective second data container when the size of data in the respective second data container reaches a predefined size.

As mentioned in the above, the predefined category representation vectors may be for example cluster centers. At this time, the predefined category representation vectors templates are separately built by selecting the cluster centers of respective second data container when the size of data in the respective second data container reaches the predefined size such as the maximum size of the second container and then are stored together with their building times. The predefined category representation vectors are not limited to the cluster centers and can be inverted keys. In the case of invented keys, the predefined category representation vectors templates are separately built by selecting the visual dictionary of respective second data container when the size of data in the respective second data container reaches the predefined size and then are stored together with their building times.

According to an embodiment of this modified manner of realization, the predefined category representation vectors template is selected according to the initialization time of the first data container currently being filled and the building times of the predefined category representation vector templates.

Figure 4A:
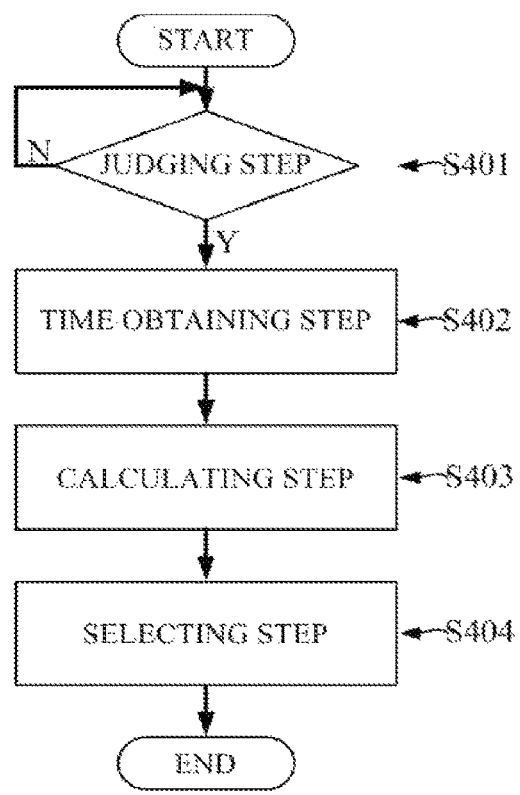
FIG. 4A shows a flowchart of a method for selecting predetermined category representation vectors according to an embodiment of modified first manner of realization.

Next a method of selecting the predefined category representation vectors according to this embodiment of the modified manner of realization is described in detail by reference to FIG. 4A.

Step S401 is a judging step of judging whether a condition of initializing the first data container is met. For example, the size of data in the first data container reaches the threshold, the time length of filling in the first data container reaches a preset time length, or the like.

Step S402 is a time obtaining step of obtaining an initialization time of a new first data container and the stored building times of the predefined category representation vectors.

Step S403 is a calculation step of calculating a difference between the initialization time and each building time.

Step S404 is a selection step of selecting a template with the minimum difference for initializing the first data container.

Figure 4B:
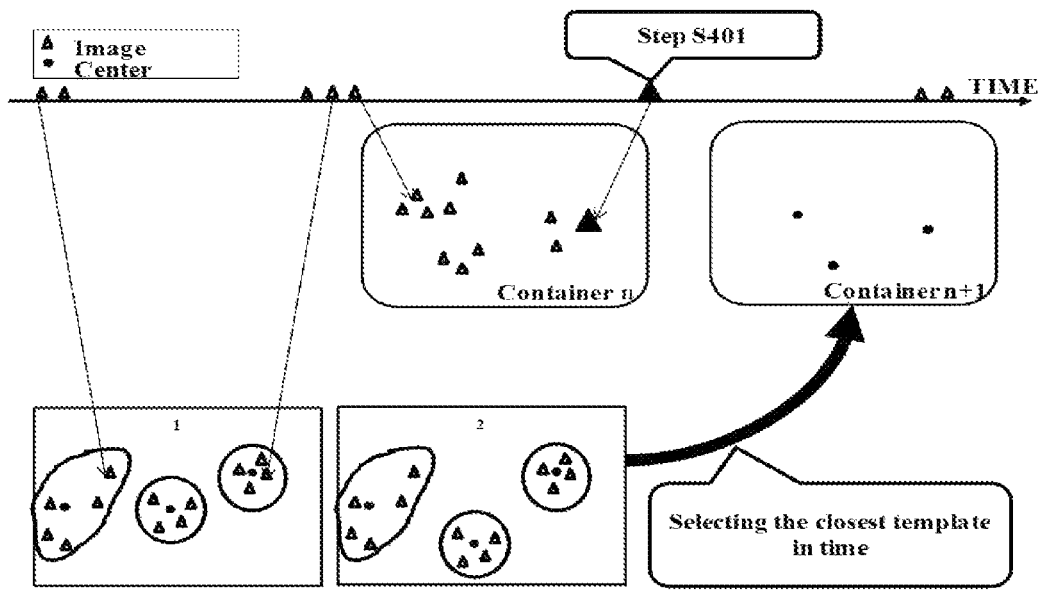
FIG. 4B shows a schematic representation of operations according to this embodiment.

FIG. 4B shows a schematic representation of the execution process of this embodiment. In FIG. 4B, in a time sequence from the left to the right, the input images are denoted by triangle symbols and the cluster centers are denoted by circle symbols. The two rectangles in the upper right corner denote two first data containers and the two rectangles in the lower left corner denote two vectors templates. Since the initialization time of the n+1th container is closest to the building time the second template, the second template is selected and its cluster centers are used to initialize the n+1th container. This is because the matching degree between the closest template in time and the n+1th container may be maximal when persons are kept entering into a location.

According to another embodiment of this modified manner of realization, the predefined category representation vectors template is selected according to an application scenario identical to that of the first data container. The application scenario includes at least one of a specific location such as an airport, a railway station, a supermarket, and the special days.

Figure 4C:
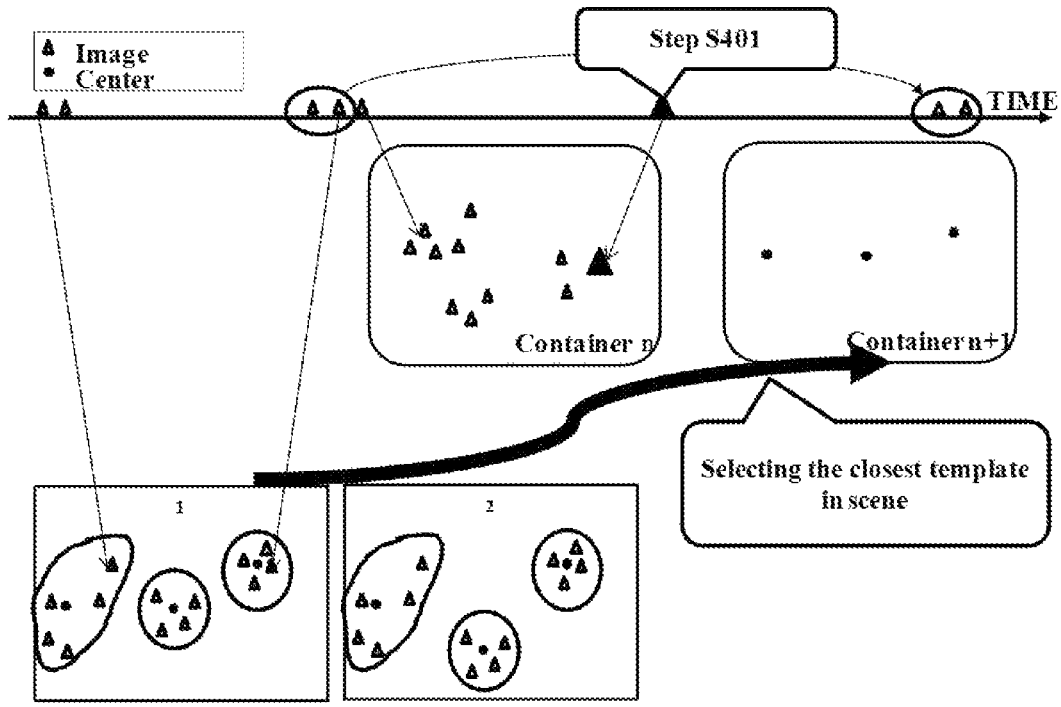
FIG. 4C shows a schematic representation of operations according to another embodiment.

FIG. 4C shows a schematic representation of the execution process of this embodiment. In FIG. 4C, in a time sequence from the left to the right, the input images are denoted by triangle symbols and the cluster centers are denoted by circle symbols. The two rectangles in the upper right corner denote two first data containers and the two rectangles in the lower left corner denote two vectors templates. Since the application scenario of the n+1th container is closest to that of the first template, the first template is selected and its cluster centers are used to initialize the n+1th container. This is because the matching degree between the closest template in time and the n+1th container may be maximal when persons are kept entering into a location. As a variant, when certain person is captured for a long period of time, we may directly select the template which has been selected for this person, as indicated by the ellipse symbol on the time axis in FIG. 4C.

According to yet another embodiment of this modified manner of realization, the predefined category representation vectors template is selected according to empirical distribution of the vectors in the first data container given the first data indexer. For example, the predefined category representation vectors template by which the vectors in the first data container have the most uniform distribution given the first data indexer is selected. This may facilitate the subsequent search process in terms of search time and accuracy.

Figure 5A:
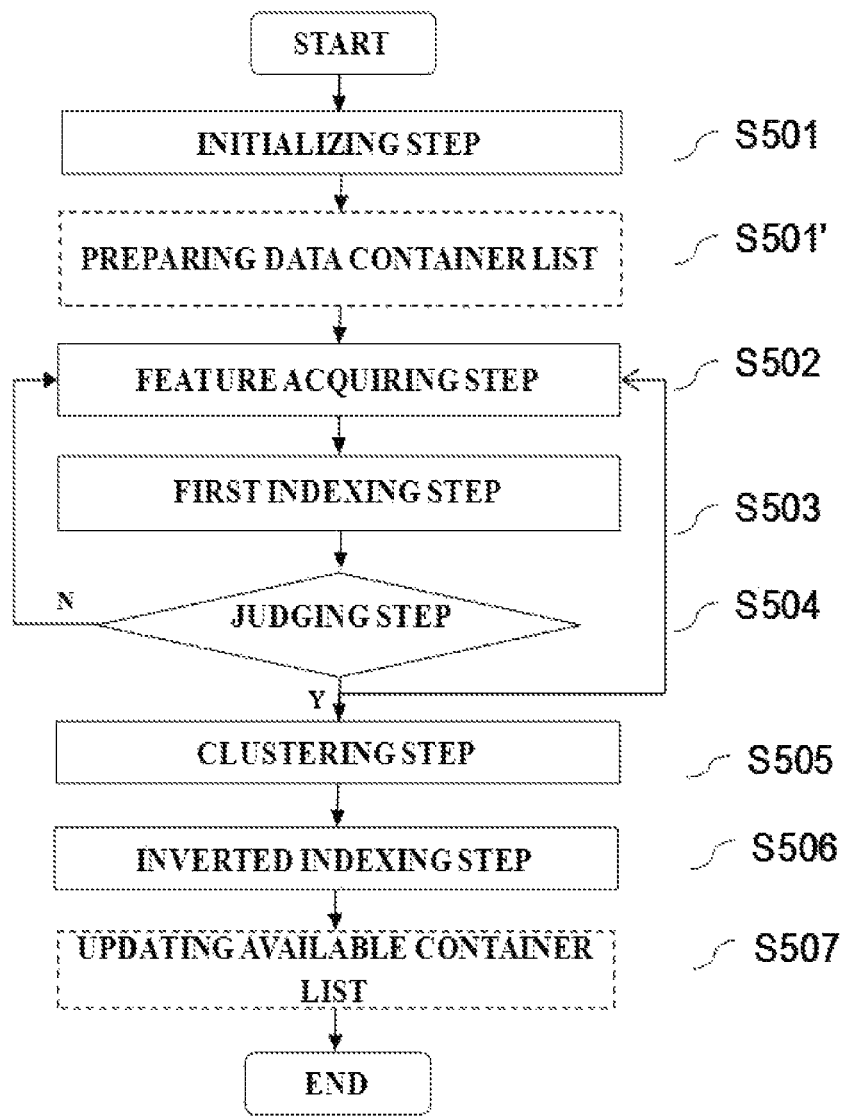
FIGS. 5A to 5B illustrate respectively a flowchart of the second manner of realization of the object indexing method of the present disclosure and a representation of an example of extracted features.

Next description will be given to the second manner of realization of the object indexing method of the present disclosure by reference to a flowchart of FIG. 5A. In this manner of realization, the first data container is obtained from the memory and the second data container is obtained from the hard disk and the classifying indexer is selected as the first data indexer and a hybrid indexer including the clustering indexer and the inverted indexer is selected as the second data indexer.

This manner of realization differs from the first manner of realization in that the inverted indexer for the attribute feature is further introduced in the case that the feature vectors include both low lever features such as LBP features and high level features such as attribute features. Hereinafter, attention is paid to the different steps and the similar steps will be simply described. However, it should be understood that the above mentioned embodiments and modified manner of realization that are not repeat can be applied to the present manner of realization.

Step S501 is the initialization step of dividing at least one first data container from the memory and at least one second data container from the hard disk and then using the classifying indexer to initialize the first data container and using the clustering indexer and the inverted indexer to initialize the second data container as mentioned in the above. Here, the predefined category representation vectors of the selected classifying indexer include cluster centers and inverted keys.

In an optional step S501' indicated by a dash line, we can also prepare a usable first data container list and a usable second data container list to record the data containers filled to the threshold for subsequent searching process.

Figure 5B:
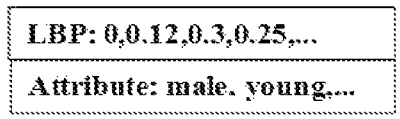

Step S502 is a feature acquiring step of acquiring the feature vectors of an input image. Here LBP features and attribute features are extracted as an example. FIG. 5B shows an example of the extracted features. The clustering indexer is suitable for the continuous LBP features and the inverted indexer is suitable for the discrete attribute features.

Step S503 is the first indexing step of adding or indexing the feature vectors of the input image into the first data container by the classifying indexer for the LBP features and attribute features.

In addition to the process similar to that described in step S303, distance based similarity scores between the randomly selected inverted keys of the classifying indexer and the attribute features of the input image are also calculated. Then the similarity scores for all the inverted keys are ranked to obtain the most similar inverted keys with the highest similarity score. Last, the input image is stored into a member list of the obtained most similar inverted keys together with the extracted attributes.

Step S504 is a judging step of judging whether the data size in the first data container currently being filled reaches the threshold. If not, it continues to Step S503. Otherwise, another first data container is selected as the first data container currently being filled and it proceeds into step 505 while continuing to execute step S503.

Step S505 is a clustering step of converting bulk data constructed in step S503 into a second data container currently available. Here, clusters are constructed by the clustering indexer for LBP features with respect to the bulk data and then the clustering results are stored into the second data container.

Step S506 is an inverted indexing step of converting bulk data constructed in step S503 into a second data container currently available. Here, inverted indexing is executed by the inverted indexer for attribute features with respect to the bulk data and then the indexing results are stored into the second data container. Only the attribute features are indexed by the inverted indexer and the indexed data structure for the attribute features is different from that for the LBP features.

In an optional step S507 indicated by a dash line, usable data container lists are updated to adding a record of the current second data container and removing a record of the first data container related to this time of conversion.

This manner of realization can achieve the similar effects as the first manner of realization while processing richer kind of features by providing a more flexible indexer structure.

Figure 6:
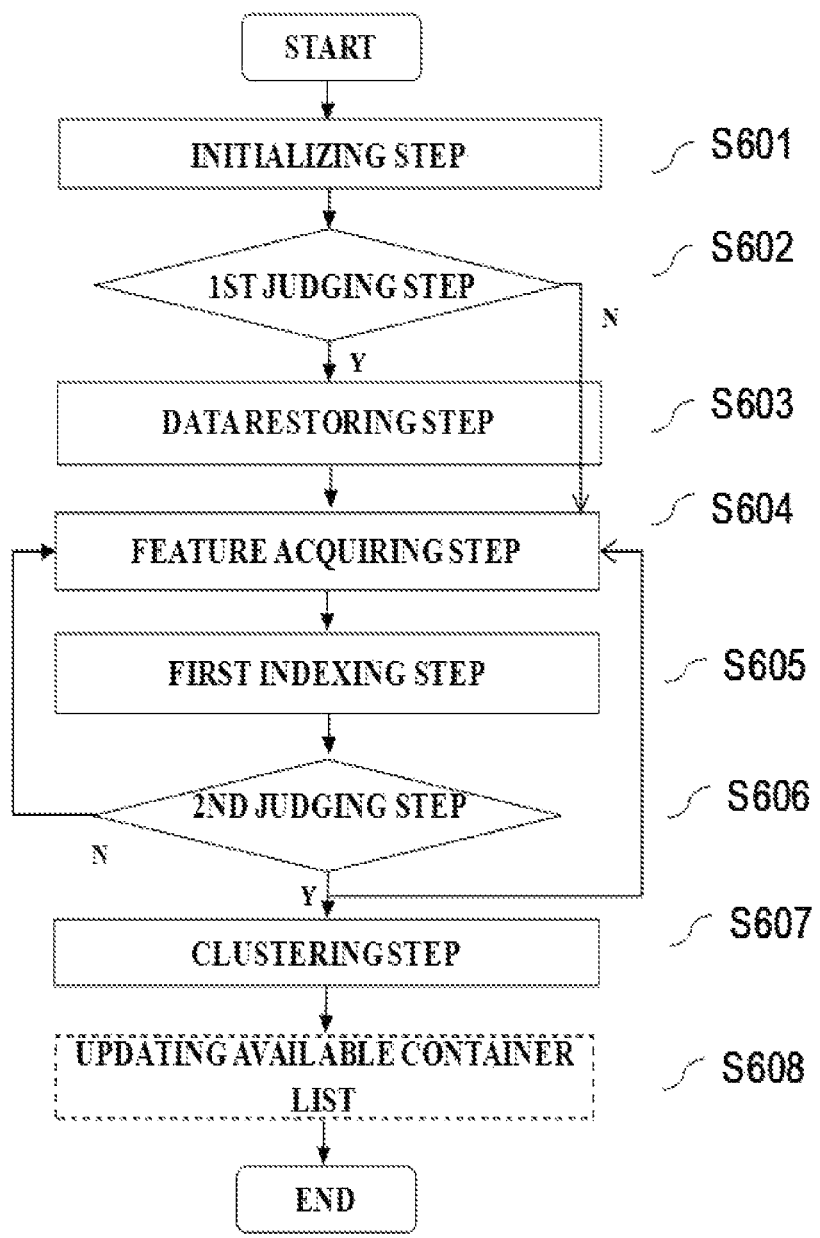
FIG. 6 illustrates a flowchart of the third manner of realization of the object indexing method of the present disclosure.

Next description will be given to the third manner of realization of the object indexing method of the present disclosure by reference to a flowchart of FIG. 6. In this manner of realization, the first data container is obtained from a hybrid container including the memory and the hard disk and the second data container is obtained from the hard disk. The classifying indexer used for the memory and a third data indexer used for the hard disk are selected as the first data indexer and the clustering indexer is selected as the second data indexer. Because the first data container includes not only a volatile data container storing feature vectors, but also a non-volatile data container storing data for restoring the feature vectors, the first data indexer further includes the third data indexer for this non-volatile data container with respect to the same feature vectors. Preferably, the third data indexer is a sequence indexer and the data for restoring the feature vectors include the feature vectors and the identifiers identifying the categories to which the feature vectors belong.

This manner of realization differs from the first manner of realization in that the first data container includes in addition to the memory data container storing feature vectors, a non-volatile data container storing identifiers for restoring the feature vectors, and the first data indexer further includes the sequence indexer for this non-volatile data container, so as to restore the data to assure the data integrity in the case of failure. Hereinafter, attention is paid to the different steps and the similar steps will be simply described. However, it should be understood that the above mentioned embodiments and modified manner of realization that are not repeat can be applied to the present manner of realization.

Step S601 is the initialization step of dividing at least one volatile data container from the memory and at least one non volatile data container from the hard disk together as the first data container and dividing at least one second data container from the hard disk, and then using the classifying indexer to initialize the volatile data container, using the third data index such as the sequence indexer to initialize the non volatile data container, and using the clustering indexer to initialize the second data container as mentioned in the above.

Step S602 is a first judging step of judging whether to restore data, for example, system collapse occurs. Here, a judgment may be made as to whether the non volatile data container in the last first data container is available. If it is available, this means the data conversion into the second data container has not ended and thus it shall proceed to step S603 to restore the data so as to avoid loss of data. If it is unusable, the data in the volatile data container currently being filled and the identifiers in the corresponding non-volatile data container are released and then it proceeds to step S604.

Step S603 is a data restoring step of restoring the memory data container to be filled currently to avoid loss of data. If the data in the non-volatile data container in the last first data container is available, then restore the corresponding volatile data container according to said data when initializing the first data container. Then it proceeds to step S604.

Step S604 is a feature acquiring step of acquiring the feature vectors of an input image. Here LBP features and attribute features are extracted as an example.

Step S605 is the first indexing step of indexing the input image into the non volatile data container by using the sequence indexer in addition to the process similar to that described in step S303. For example, the feature vectors and the corresponding category identification are directly recorded into the non volatile data container sequentially. Therefore, when data restoration is executed, the category data in the volatile data container can be restored according to these feature vectors and the corresponding identifications. According to such a principle for restoring, it is known that the third data indexer is not limited to a sequence indexer but can be other suitable indexers.

Step S606 is a second judging step of judging whether the data size in the first data container currently being filled reaches the threshold. If not, it continues to Step S604. Otherwise, another first data container is selected as the first data container currently being filled and it proceeds into step 607 while continuing to execute step S604.

Step S607 is a clustering step of converting bulk data constructed in step S605 in the volatile data container into a second data container currently available. Here, clusters are constructed by the clustering indexer for LBP features with respect to the bulk data and then the clustering results are stored into the second data container.

In an optional step S608 indicated by a dash line, usable data container lists are updated to adding a record of the current second data container and removing a record of the first data container related to this time of conversion.

This manner of realization can achieve the similar effects as the first manner of realization while assuring the data integrity in the case of failure by providing a more flexible data container structure. It should be understood this manner of realization can be combined with the second manner of realization by incorporating the inverted indexer and it is not described repeatedly.

Figure 7:
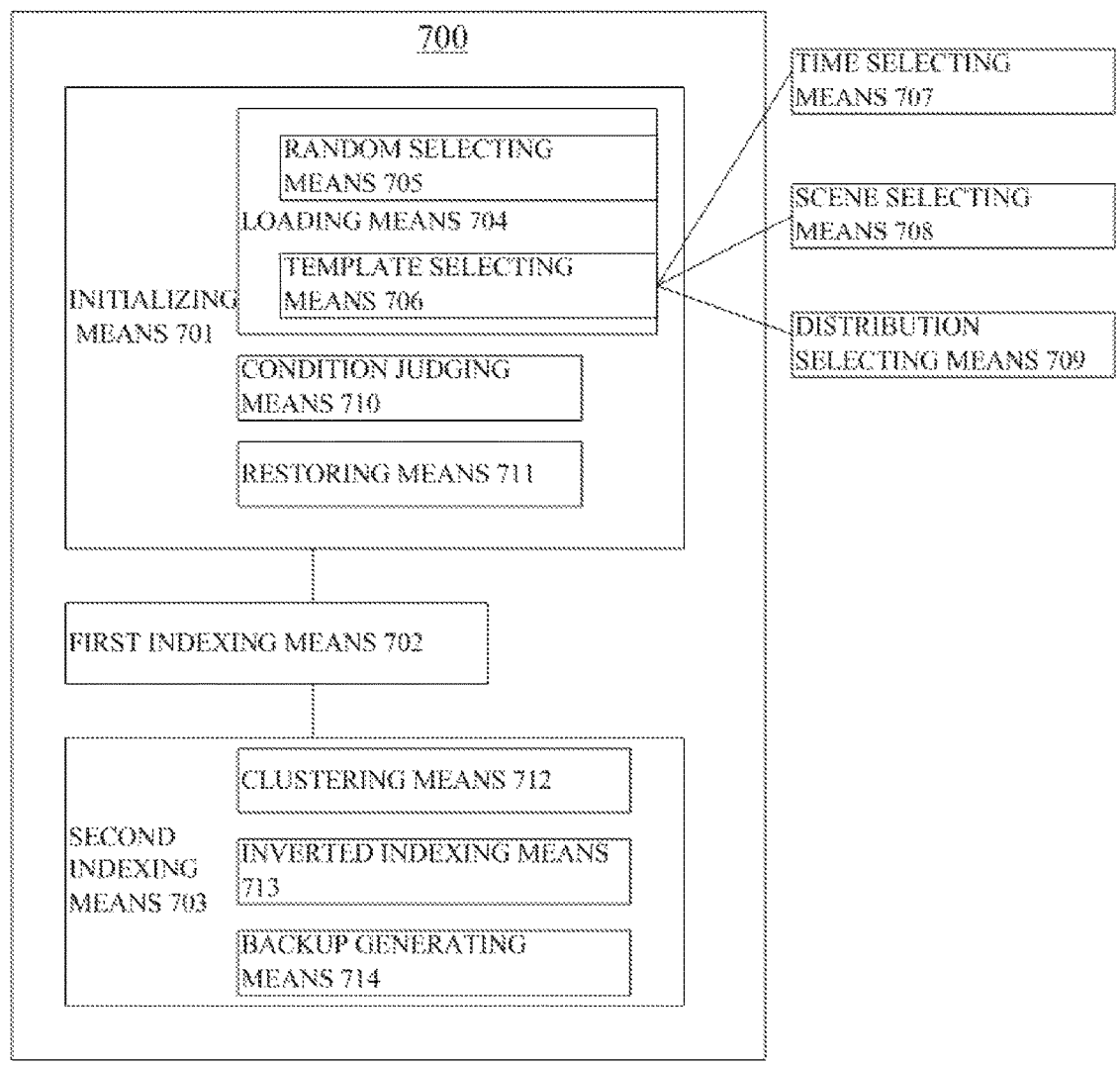
FIG. 7 illustrates a block diagram of an exemplary configuration of an object indexing device according to a manner of realization of the present disclosure.

Next, a block diagram of an exemplary configuration of an object indexing device 700 according to the present disclosure will be described in relation to FIG. 7. The object indexing device 700 comprises: an initializing means 701 configured to divide at least one first data container and at least one second data container, and initializing respectively the first and the second data containers by using a first data indexer and a second data indexer, the first and second data indexers being used respectively to fill the first and the second data containers and build data structures in the first and the second data containers; a first indexing means 702 configured to add the input feature vector of a specific object into a first data container currently being filled by using the first data indexer; a second indexing means 703 configured to, when the data size in the first data container currently being filled has reached a threshold, select another first data container as the first data container currently being filled, and in the case of indexing by the first indexing means, convert bulk data in the first data container previously being filled into one available second data container by using the second data indexer; wherein the sizes of the first and the second data containers being set such that the time period in which the second data index converts the bulk data into the second data container is no larger than the time period in which the first data indexer fills the first data container to the threshold.

The above means 701 to 703 can be configured to execute steps S201 to S203 of the above described object indexing method respectively.

Preferably, the first data indexer is a classifying indexer and the initializing means 701 comprises a loading means 704 configured to initialize the first data container by loading therein predefined category representation vectors characterizing the classifying indexer.

Preferably, the first data container is a volatile data container.

Preferably, the second data indexer includes a clustering indexer, and the second indexing means 703 includes means configured to use the clustering indexer to convert the bulk data in the first data container previously being filled and store the conversion result into the second data container, called clustering means 712.

Preferably, the second data indexer further includes an inverted indexer, and the second indexing means 703 further includes means configured to use the reversed indexer to convert the bulk data in the first data container previously being filled and store the conversion result into the second data container, called inverted indexing means 713.

Preferably, the first data container is a hybrid container including a volatile data container storing feature vectors and a non-volatile data container storing identifiers for restoring the feature vectors, and the first data indexer further includes a third data indexer for this non-volatile data container. The initializing means 701 further comprises means configured to, if the second indexing step succeeds in converting the bulk data of the volatile data container currently being filled into the second data container, release the data in the volatile data container currently being filled and release the identifiers in the corresponding non-volatile data container; otherwise, if the data in the non-volatile data container in the last first data container is available, restore said data into the corresponding volatile data container when initializing the first data container, called restoring means 711. The third data indexer is preferably a sequence indexer.

Preferably, the predefined category representation vectors include at least one of cluster centers and inverted keys.

Preferably, the loading means 704 comprises means configured to randomly select the predefined category representation vectors, called randomly selecting means 705.

Preferably, the loading means 704 comprises means configured to select the predefined category representation vectors according to a predefined category representation vectors template being selected, called template selecting means 706, the predefined category representation vectors templates being separately built based on the data of respective second data container when the size of data in the respective second data container reaches a predefined size.

Preferably, the template selecting means 706 further comprises means configured to select the predefined category representation vectors template according to the initialization time of the first data container currently being filled and the building time of a predefined category representation vector template, called time selecting means 707.

Preferably, the predefined category representation vector template whose building time is closest to the initialization time of the first data container currently being filled is selected.

Preferably, the template selecting means 706 further comprises means configured to select the predefined category representation vectors template according to an application scenario identical to that of the first data container, called scenario selecting means 708.

Preferably, the application scenario includes at least one of a specific location such as an airport, a railway station, a supermarket, and the special days.

Preferably, the template selecting means 706 further comprises means configured to select the predefined category representation vectors template according to empirical distribution of the vectors in the first data container given the first data indexer, called distribution selecting means 709.

Preferably, the predefined category representation vectors template by which the vectors in the first data container have the most uniform distribution given the first data indexer is selected.

Preferably, the initializing means 701 further comprises means configured to initialize the first data container by using the first data indexer when one of the following conditions is met: the size of data filled in the first data container reaches the threshold; the time length of filling in the first data container reaches a preset length, called condition judging means 710.

Preferably, the second indexing means 703 further includes means configured to release the first data container currently being filled and generate a snap of the bulk data in the first data container when the data size in the first data container currently being filled has reached the threshold, called backup generating means 714.

Preferably, the first data container or the second data container comprises at least one of: a volatile data container; a non-volatile data container; and a remote data container.

Preferably, the first data indexer or the second data indexer comprises at least one of: a sequence indexer; a classifying indexer; a clustering indexer; an inverted indexer; a tree indexer; and a hash indexer.

Preferably, the third data indexer is a sequence indexer and the data for restoring the feature vectors include the feature vectors and the identifiers identifying the categories to which the feature vectors belong.

The means described above are exemplary and/or preferable means for implementing the spot recommendation method described in the present disclosure. The means can be hardware units (such as a CPU (CPU 1001 in FIG. 9), a field programmable gate array, a digital signal processor, or an application specific integrated circuit or the like) and/or software means (such as a computer readable program). The means for implementing the various steps are not described exhaustively above. However, where there is a step of performing a certain process, there may be a corresponding means (implemented by hardware and/or software) for implementing the same process. Technical solutions defined by all combinations of steps described and means corresponding to these steps are included in the disclosure of the present disclosure, as long as the technical solutions they constitute are complete and applicable.

In addition, the above device constituted by various means may be merged into hardware means such as a computer as a functional module. Of course the computer may have other hardware or software elements in addition to these functional modules.

The object indexing device according to at least one embodiment of the present disclosure can assure that different indexing methods (indexers) are used for indexing in different data containers in parallel, such that faster and more accurate indexing can be obtained in real time even when feature vectors are input continuously.

Figure 8A:
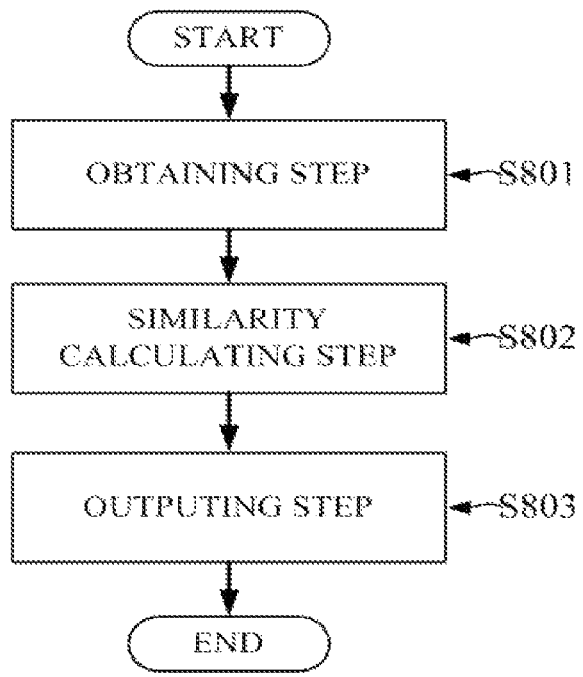
FIGS. 8A to 8B illustrates respectively a flowchart of an object searching method according to a manner of realization and a block diagram of an exemplary configuration of an object searching device.
Figure 8B:
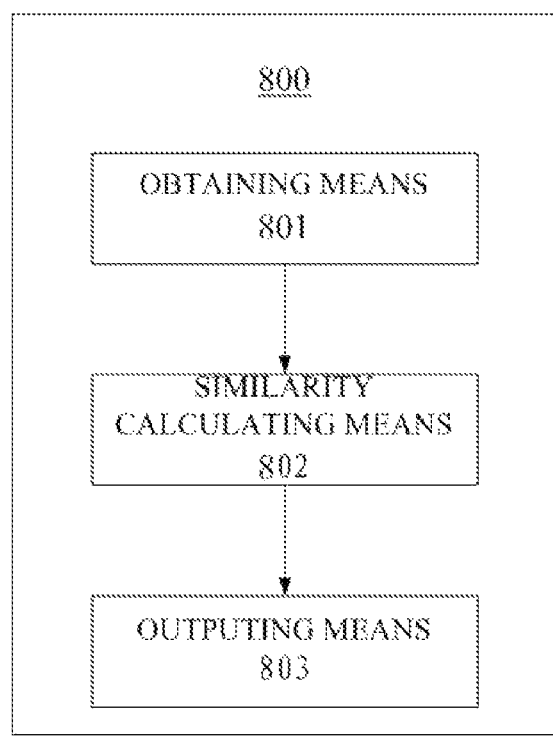

The object indexing method and object indexing device according to one or more embodiments of the present disclosure can have many applications. For example, they can be applied respectively to an object searching method and object searching device. FIGS. 8A to 8B shows respectively a flowchart of an object searching method and a block diagram of an exemplary configuration of an object searching device 800 according to another manner of realization of the present application.

As shown in FIG. 8A, the object searching method comprises: an obtaining step S801 of obtaining the feature vector of an input query object; a similarity calculation step S802 of calculating similarity between the feature vector of the input query object and the feature vectors of objects indexed by the above mentioned object indexing method; and an output step S803 of outputting object search result by the calculated similarity.

In the similarity calculation step S802, each data container comprises certain clusters by taking the clustering results in the data containers as an example. First, a similarity score is calculated using the distances between the representation vectors for example clustering centers of clusters of at least one data container and the feature vector of the input query object.

Then, the top K clusters will be selected according to the similarity scores from high to low. Or the strategy can be selecting top K cluster by the similarity scores from high to low for each container, then combining them together. Usually the K parameter can be 1000. At last, all images in all selected clusters will be integrated into a uniform set to calculate the similarity scores between the feature vectors of the query image and the images from selected clusters.

In the output step S803, the top N images will be selected and output according to the similarity scores from high to low. The strategy can be selecting top N images by the similarity scores from high to low.

Preferably, the similarity calculation step S802 also comprises before starting the search, getting usable container list. The search will be done on the data of the usable container list.

Preferably, the similarity calculation step S802 also comprises selecting containers according to a search condition. The search condition can be time limitation or camera limitation or other condition. Selecting containers according to the search condition can reduce the data set size that is needed to be calculated. This can improve search speed and search accuracy.

Similarly, as shown in FIG. 8B, the object searching device 800 can comprise: an obtaining means 801 configured to obtain the feature vector of an input query object; a similarity calculation means 802 configured to calculate similarity between the feature vector of the input query object and the feature vectors of objects indexed by the above mentioned object indexing method; and an output means 803 configured to output object search result by the calculated similarity. This object searching device 800 can also be configured in a similar way as the software/hardware configuration described by reference to FIG. 7.

According to yet another manner of realization, one or more embodiments of the present disclosure relate to an object indexing system implemented on a computer including one or more processor and one or more storage means, characterized in that the processor is configured to realize the above mentioned object indexing method.

Figure 9:
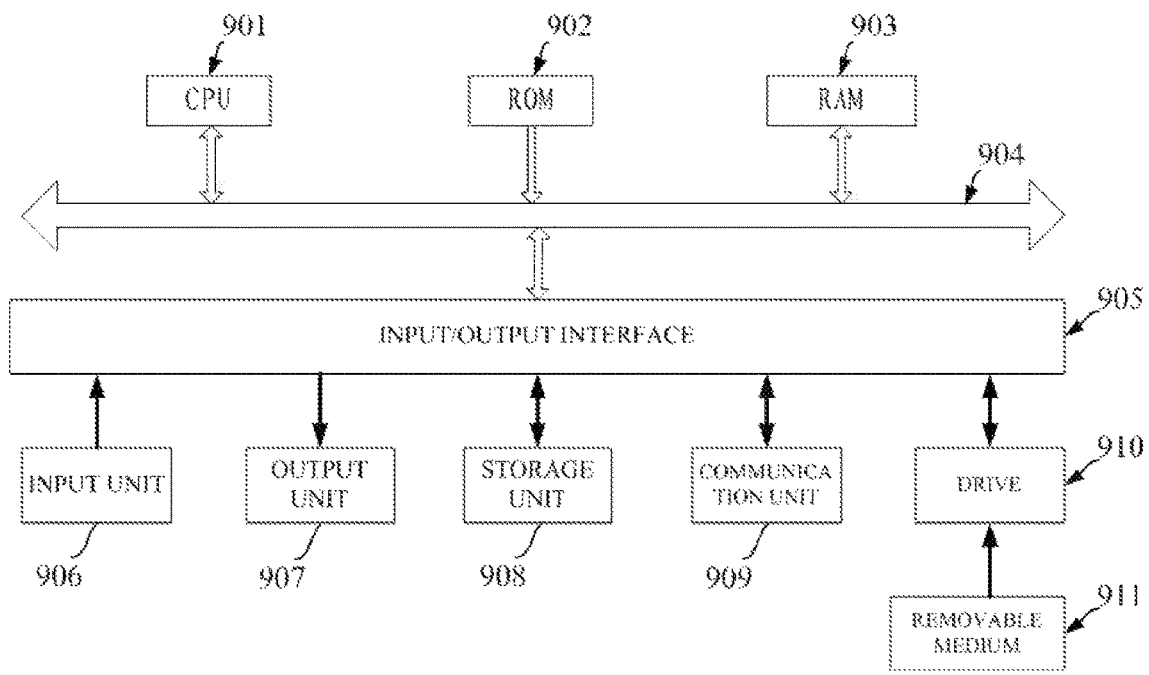
FIG. 9 illustrates a block diagram of a hardware configuration of a computer system in which the manners of realization in the present disclosure may be implemented.

FIG. 9 is a block diagram illustrating the hardware configuration of the computer system in which the manners of realization of one or more embodiments of the present application can be implemented.

As shown in FIG. 9, the computer system comprises a processing unit 901, a read-only volatile 902, a random access volatile 903, an input/output interface 905, an input unit 906, an output unit 907, a storage unit 908, a communication unit 909, and a driver 910 connected via a system bus 904. The program may be recorded in advance in the ROM (read-only volatile) 902 as the record medium built in the computer or the storage unit 908. Alternatively, the program may be stored (recorded) in a removable medium 911. Herein, the removable medium 911 comprises, for example, a floppy disc, a CD-ROM (compact disc-read only volatile), a MO (magnetic-optical) disc, a DVD (digital versatile disc), a magnetic disc, a semiconductor storage, and so on.

The input unit 906 is used for inputting a user request and configured with a keypad, a mouse, touch panel, a microphone or the like. Further, the output unit 907 is configured with a liquid crystal display, speaker or the like.

Furthermore, the program may be downloaded on the computer through a communication network or a broadcast network so as to be installed into the built-in storage unit 908, in addition to the configuration in which the program is installed on the computer from the removable medium 911 mentioned above through the driver 910. In other words, the program may be transmitted to the computer, for example, in a wireless manner from the download site through a satellite for a digital satellite broadcast or in a wired manner through a network such as a LAN (local area network) or the internet, etc.

If an instruction is input via the input/output interface 905 through the user manipulation of the input unit 906, etc., CPU 901 will execute the program stored in the ROM 902 according to the instruction. Alternatively, CPU 901 loads a program stored in the storage unit 908 on the RAM 903 for executing the program.

Therefore, CPU 901 executes the processes according to the flowchart mentioned above or the processes executed by the configuration of the block diagram mentioned above. Next, if necessary, CPU 901 permits the processing results to be output for example from the output unit 907 via the input/output interface 905, transmitted via the communication unit 909, recorded in the storage unit 908 or the like.

In addition, a program can be executed by a computer (processor). Further, a program can be processed by plurality of computers in a distributed manner. Moreover, a program can be transmitted to a remote computer to be executed.

The computer system shown in FIG. 9 is merely illustrative but not intends to limit the present disclosure and the use or application thereof.

The computer system shown in FIG. 9 can be implemented in any embodiment, functions as an individual computer, or functions as a processing system in an apparatus. One or more components can be removed from the computer system if unnecessary or added to the computer system as additional components.

It is possible to carry out one or more embodiments of the method and device of the present disclosure in many ways. For example, it is possible to carry out one or more embodiments of the method and device of the present disclosure through software, hardware, firmware or any combination thereof. The above described order of the steps of the method is only intended to be illustrative, and the steps of the method of the present disclosure are not limited to the above specifically described order unless otherwise specifically stated. Besides, in some embodiments, the present disclosure may also be embodied as programs recorded in recording medium, including machine-readable instructions for implementing the method according to the present disclosure. Thus, the present disclosure also covers the recording medium which stores the program for implementing the method according to the present disclosure.

Although some specific embodiments of the present disclosure have been described in detail with examples, it should be understood by a person skilled in the art that the above examples are only intended to be illustrative but not to limit the scope of the present disclosure. It should be understood by a person skilled in the art that the above embodiments can be modified without departing from the scope and spirit of the present disclosure.

What is claimed is:

1. An object indexing method comprising:
    dividing at least one first data container and at least one second data container, and initializing respectively the first and the second data containers by using a first data indexer and a second data indexer, the first and second data indexers being used respectively to fill the first and the second data containers and build data structures in the first and the second data containers, wherein the first data indexer is a classifying indexer and the first data container is initialized by selecting predefined category representation vectors characterizing the classifying indexer according to a predefined category representation vectors template being selected, and loading the predefined category representation vectors in the first data container, the predefined category representation vectors templates being separately built based on the data of respective second data container when the size of data in the respective second data container reaches a predefined size;
    adding an input feature vector of a specific object into a first data container currently being filled by using the first data indexer; and
    when data size in the first data container currently being filled has reached a threshold, selecting another first data container as the first data container to be filled next, and converting bulk data in the first data container previously being filled into one available second data container by using the second data indexer,
    wherein the sizes of the first and the second data containers are set such that a time period in which the second data indexer converts the bulk data into the second data container is no larger than a time period in which the first data indexer fills the first data container to the threshold.

2. The object indexing method according to claim 1, wherein the first data container is a volatile data container.

3. The object indexing method according to claim 1, wherein the second data indexer includes a clustering indexer, and the second indexing step includes using the clustering indexer to convert the bulk data in the first data container previously being filled and storing the conversion result into the second data container.

4. The object indexing method according to claim 3, wherein the second data indexer further includes an inverted indexer, and the second indexing step further includes using the inverted indexer to convert the bulk data in the first data container previously being filled and storing the conversion result into the second data container.

5. The object indexing method according to claim 1, wherein the first data container is a hybrid container including a volatile data container storing feature vectors and a non-volatile data container storing data for restoring the feature vectors, and the first data indexer further includes a third data indexer for this non-volatile data container with respect to the same feature vectors;
    the initializing step further comprises if the second indexing step succeeds in converting the bulk data of the volatile data container currently being filled into the second data container, releasing the data in the volatile data container currently being filled and releasing the data in the corresponding non volatile data container; otherwise, if the data in the non volatile data container in a last first data container is available, restoring the corresponding volatile data container according to the data when initializing the first data container.

6. The object indexing method according to claim 1, wherein the predefined category representation vectors include at least one of cluster centers and inverted keys.

7. The object indexing method according to claim 6, wherein the loading step further comprises randomly selecting the predefined category representation vectors.

8. The object indexing method according to claim 1, wherein the template selecting step further comprises a step of selecting the predefined category representation vectors template according to the initialization time of the first data container currently being filled and the building time of each predefined category representation vector template.

9. The object indexing method according to claim 8, wherein it further includes selecting the predefined category representation vector template whose building time is closest to the initialization time of the first data container currently being filled.

10. The object indexing method according to claim 1, wherein the template selecting step further comprises a step of selecting the predefined category representation vectors template according to an application scenario identical to that of the first data container.

11. The object indexing method according to claim 10, wherein the application scenario includes at least one of a specific location and the special days.

12. The object indexing method according to claim 1, wherein the template selecting step further comprises a step of selecting the predefined category representation vectors template according to an empirical distribution of the vectors in the first data container given the first data indexer.

13. The object indexing method according to claim 12, wherein it further includes selecting the predefined category representation vectors template by which the vectors in the first data container have the most uniform distribution given the first data indexer.

14. The object indexing method according to claim 1, wherein the initializing step further includes initializing the first data container by using the first data indexer when one of the following conditions is met: the size of data filled in the first data container reaches the threshold; and the time length of filling in the first data container reaches a preset length.

15. The object indexing method according to claim 1, wherein the first data container or the second data container comprises at least one of: a volatile data container; a non-volatile data container; and a remote data container.

16. The object indexing method according to claim 1, wherein the first data indexer or the second data indexer comprises at least one of: a sequence indexer; a classifying indexer; a clustering indexer; an inverted indexer; a tree indexer; and a hash indexer.

17. The object indexing method according to claim 1, wherein the second indexing step further includes releasing the first data container currently being filled and generating a backup of the bulk data in the first data container when the data size in the first data container currently being filled has reached the threshold.

18. The object indexing method according to claim 5, wherein the third data indexer is a sequence indexer and the data for restoring the feature vectors include the feature vectors and the identifiers identifying the categories to which the feature vectors belong.

19. An object searching method, characterized in that it comprises:
   an acquiring step of acquiring a feature vector of an input query object;
   a similarity calculation step of calculating similarity between the feature vector of the input query object and the feature vectors of objects indexed by the object indexing method according to claim 1; and
   an outputting step of outputting object search result by the calculated similarity.

20. An object indexing apparatus comprising one or more processors carrying out functions of an initializing unit, a first indexing unit, and a second indexing unit;
   the initializing unit dividing at least one first data container and at least one second data container, and initialize respectively the first and the second data containers by using a first data indexer and a second data indexer, the first and second data indexers being used respectively to fill the first and the second data containers and build data structures in the first and the second data containers; wherein the first data indexer is a classifying indexer and the first data container is initialized by selecting predefined category representation vectors characterizing the classifying indexer according to a predefined category representation vectors template being selected, and loading the predefined category representation vectors in the first data container, the predefined category representation vectors templates being separately built based on the data of respective second data container when the size of data in the respective second data container reaches a predefined size;
   the first indexing unit adding an input feature vector of a specific object into a first data container currently being filled by using the first data indexer; and
   the second indexing unit configured to, when data size in the first data container currently being filled has reached a threshold, selecting another first data container as the first data container to be filled next, and converting bulk data in the first data container previously being filled into one available second data container by using the second data indexer;
   wherein the sizes of the first and the second data containers are set such that a time period in which the second data indexer converts the bulk data into the second data container is no larger than a time period in which the first data indexer fills the first data container to the threshold.

21. A non-transitory computer-readable medium storing a program for causing a computer to execute an object indexing method, the method comprising:
   dividing at least one first data container and at least one second data container, and initializing respectively the first and the second data containers by using a first data indexer and a second data indexer, the first and second data indexers being used respectively to fill the first and the second data containers and build data structures in the first and the second data containers, wherein the first data indexer is a classifying indexer and the first data container is initialized by selecting predefined category representation vectors characterizing the classifying indexer according to a predefined category representation vectors template being selected, and loading the predefined category representation vectors in the first data container, the predefined category representation vectors templates being separately built based on the data of respective second data container when the size of data in the respective second data container reaches a predefined size;
   adding an input feature vector of a specific object into a first data container currently being filled by using the first data indexer; and
   when data size in the first data container currently being filled has reached a threshold, selecting another first data container as the first data container to be filled next, and converting bulk data in the first data container previously being filled into one available second data container by using the second data indexer;
   wherein the sizes of the first and the second data containers are set such that a time period in which the second data indexer converts the bulk data into the second data container is no larger than a time period in which the first data indexer fills the first data container to the threshold.

* * * * *